R. H. DOANE.
Nut-Locks.

No. 153,192.            Patented July 21, 1874.

Witnesses:
J. R. Nottingham
Edmund Masson

Inventor:
Richard H. Doane
By Atty. A. B. Stoughton

UNITED STATES PATENT OFFICE.

RICHARD H. DOANE, OF CANTON, OHIO, ASSIGNOR OF ONE-HALF HIS RIGHT TO LEWIS V. BOCKIUS AND MARCUS E. WILCOX.

IMPROVEMENT IN NUT-LOCKS.

Specification forming part of Letters Patent No. 153,192, dated July 21, 1874; application filed June 4, 1874.

*To all whom it may concern:*

Be it known that I, RICHARD H. DOANE, of Canton, in the county of Stark and State of Ohio, have invented certain new and useful Improvement in Nut-Locks; and I do hereby declare the following to be a full, clear, and exact description of the same, reference being had to the accompanying drawing, making part of this specification, in which—

Figure 1:
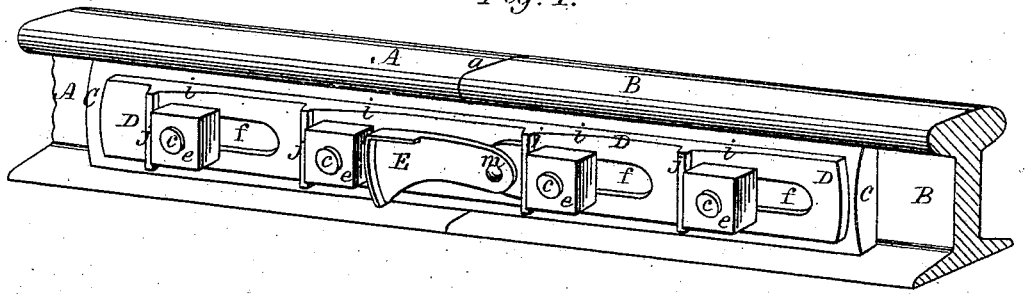
Figure 2:
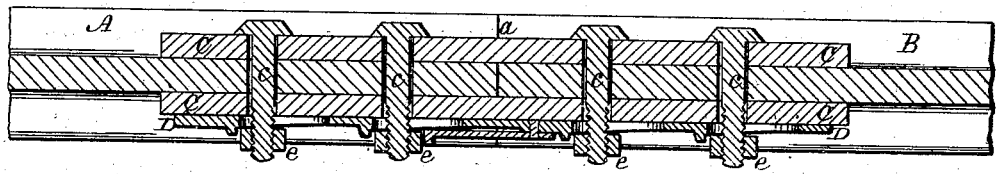
Figure 3:
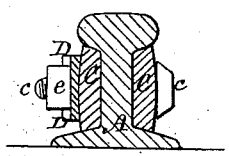

Figure 1 represents in perspective my nut-lock as applied to the fish-pieces and joint of railroad-rails, to which it is particularly applicable. Fig. 2 represents a horizontal section through the rails, fish-pieces, lock-plate, and screw-bolts; and Fig. 3 represents a vertical section through the rail, fish-pieces, and lock-plate.

My invention consists in combining with the lock-plate and bolt and nuts the inclined planes and ribs on the lock-plate for tightening and holding the screw-nuts. And it further consists in combining, with the lock-plate and its slots, planes, and ribs, and with one of the nuts, a pivoted cam, which, when swung against its nut, holds the whole series, as well as the lock-plate, from moving or creeping, as will be explained.

A B represent railroad-rails, and $a$ the joint between them. C C are fish-pieces laid in the waist of the rails to strengthen the joint, in the usual well-known way. $c\,c\,c\,c$ are the screw-bolts which pass through the rails and fish-pieces, and which are drawn up and held by nuts $e$. To prevent these nuts from working loose I have devised and constructed a locking-plate, D, as follows: First, there are a series of slots, $f$, through said plate, as many as the number of bolts designed to be used, these slots being wide enough to take in the shanks of the bolts $c$. The plate D in the line of its length is composed of a series of planes or wedge-shaped surfaces, as seen at $i$, and at the end of each of these planes or wedge-shaped surfaces there is a vertical rib, $j$, which, when it comes against one of the nuts $e$, defines the distance that said plate can move when its planes or wedges are forced in under the nuts. And when the nuts or any of them come against the ribs which project from the surface of the plate, said nut cannot turn or be turned on its screw-bolt. Upon the plate D there is pivoted, as at $m$, a cam, E, which, when let down against one of the series of nuts, prevents the plate from moving in a direction that would slack up the nuts, so that the plate holds the nuts from backing on their bolts, and one of the nuts and bolts prevents the plate from moving on the fish-piece, or whatever it bears against.

And while I have described this plate D and its planes and ribs as separate from the fish-piece $c$, yet the fish-piece itself may constitute the lock-plate, by having the planes or wedge-shaped surfaces and the ribs worked thereon, instead of on a separate plate or piece.

To apply the lock-plate D, the bolts $c$ are passed through the fish-pieces and the rails and through the slots $f$ of the lock-plate, and the nuts $e$ are run on against the lock-plate; the latter is then driven or forced endwise, causing the wedge-shaped surfaces to come tight up against the nuts, and the ribs to come against the nuts, which prevent the latter from turning. The cam E is then let down against one of the nuts on the side opposite the rib of that nut, and the whole is then locked against moving or loosening.

What I claim is—

1. In nut-locks the combination of the lock-plate D, with its slots, wedge-shaped planes, and ribs, and the bolts and nuts operating therewith, as and for the purpose described and represented.

2. In combination with the rails, fish-pieces, locking-plate, having slots, planes and ribs, and screw-bolts, the cam E, for locking the plate in position, as described and represented.

RICHARD H. DOANE.

Witnesses:
JOHN ROBBINS,
CHARLES F. PERKINS.